United States Patent [19]
Jones et al.

[11] Patent Number: 5,060,706
[45] Date of Patent: * Oct. 29, 1991

[54] BEAD RETAINER

[75] Inventors: Paul W. Jones, Norton; John R. Abbott, Cuyahoga Falls; Roger A. Fleming, Stow, all of Ohio

[73] Assignee: The Goodyear Tire & Rubber Company, Akron, Ohio

[ * ] Notice: The portion of the term of this patent subsequent to Mar. 19, 2008 has been disclaimed.

[21] Appl. No.: 668,662

[22] Filed: Mar. 13, 1991

Related U.S. Application Data

[63] Continuation of Ser. No. 348,832, May 8, 1988, Pat. No. 5,000,240.

[51] Int. Cl.⁵ .............................................. B60C 15/02
[52] U.S. Cl. .............................. 152/381.5; 152/379.3; 152/400
[58] Field of Search ............... 152/379.3, 379.4, 379.5, 152/381.3, 381.4, 381.5, 381.6, 382, 383, 396, 399, 400, 388, 389, 391, 516, 520

[56] References Cited

U.S. PATENT DOCUMENTS

| | | | |
|---|---|---|---|
| 28,196 | 10/1874 | Patecell | 152/323 |
| 32,693 | 6/1888 | Winfield . | |
| 287,479 | 12/1886 | Winfield | D. 12/153 |
| 288,427 | 2/1887 | Winfield . | |
| 632,028 | 8/1899 | Smith . | |
| 939,638 | 11/1909 | Rowling . | |
| 1,335,411 | 3/1920 | Wagenhorst . | |
| 2,367,828 | 1/1945 | Brink . | |
| 2,383,577 | 8/1945 | Zarth . | |
| 2,409,410 | 10/1946 | Zarth . | |
| 2,440,740 | 5/1948 | Waddio . | |
| 2,857,951 | 10/1958 | Rondebush | 152/514 |
| 3,250,310 | 5/1966 | Johnson . | |
| 3,872,907 | 3/1975 | Curtiss, Jr. et al. . | |
| 3,903,946 | 9/1975 | French et al. | 152/399 |
| 3,935,892 | 2/1976 | Arimura et al. | 152/517 |
| 4,163,466 | 8/1979 | Watts | 152/188 |
| 4,246,948 | 1/1981 | Sarkissian | 152/379.5 |
| 4,293,016 | 10/1981 | Bible et al. . | |
| 4,558,728 | 12/1985 | Forneris | 152/400 |
| 4,573,509 | 3/1986 | Smith et al. | 152/500 X |
| 4,662,419 | 5/1987 | Winfield | 152/381.6 |
| 4,681,147 | 6/1987 | Hugele | 152/520 X |
| 4,709,738 | 12/1987 | Goodell et al. | 152/400 |
| 4,773,461 | 9/1988 | Landers et al. . | |
| 4,776,377 | 10/1988 | Susini et al. | 152/399 |
| 4,784,202 | 11/1988 | White | 152/381.5 |
| 4,823,854 | 4/1989 | Payne et al. | 152/399 X |

FOREIGN PATENT DOCUMENTS

| | | | |
|---|---|---|---|
| 0159274 | 10/1985 | European Pat. Off. | 152/379.4 |
| 2550441 | 5/1976 | Fed. Rep. of Germany | 152/381.6 |
| 3439949 | 5/1986 | Fed. Rep. of Germany | 152/399 |
| 2234147 | 1/1975 | France . | |
| 2427918 | 6/1979 | France . | |

OTHER PUBLICATIONS

Fires & Equipment for Military Vehicles, 8/1943.

Primary Examiner—Russell D. Stormer
Attorney, Agent, or Firm—David L. King

[57] ABSTRACT

A device (20) for retaining the beads of a tire against the flanges of a rim. The bead retainer device (20) is capable of being manufally deformable in the axial direction. The bead retainer device is also capable of being manually deformable in the circumferential direction such as to be collapsible.

16 Claims, 9 Drawing Sheets

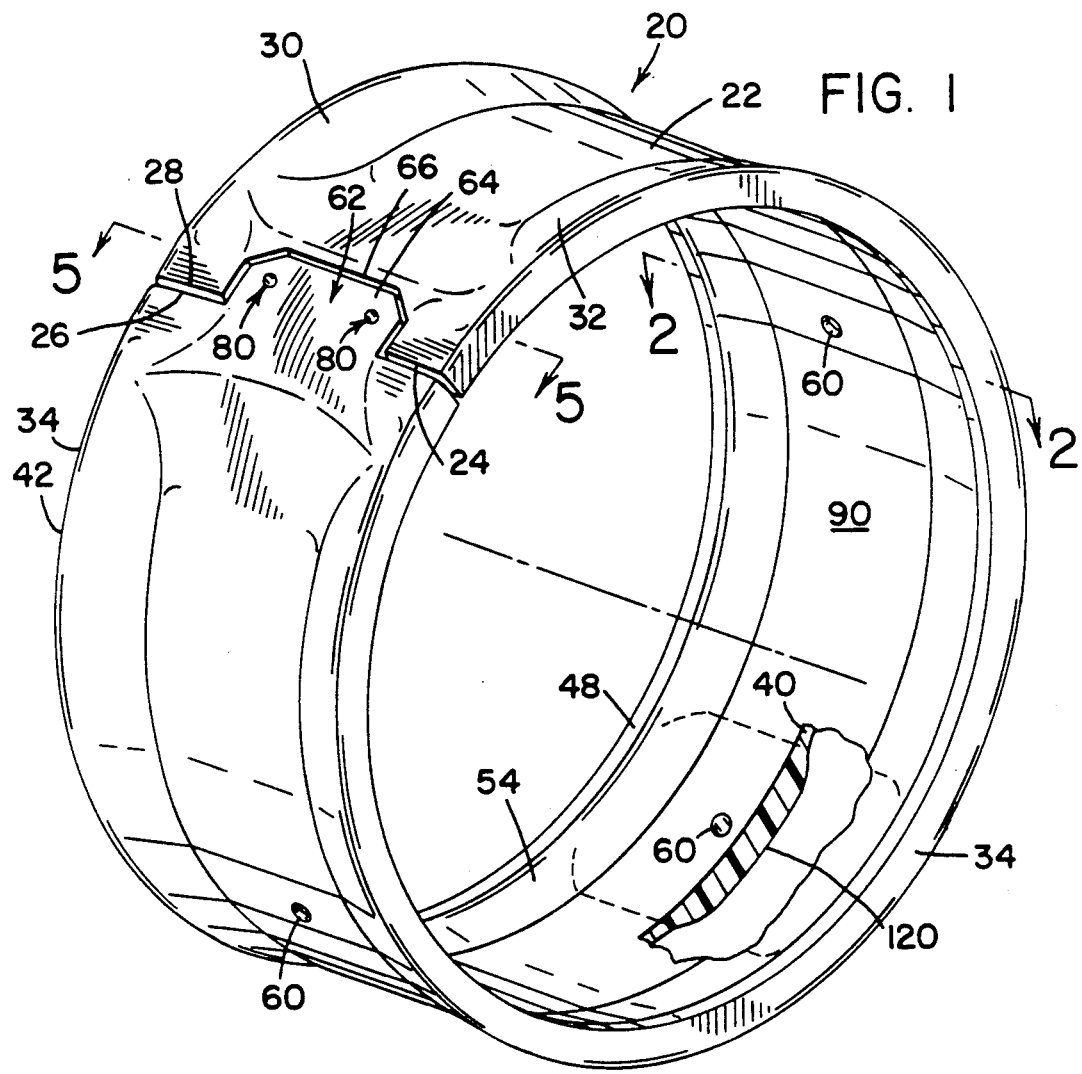
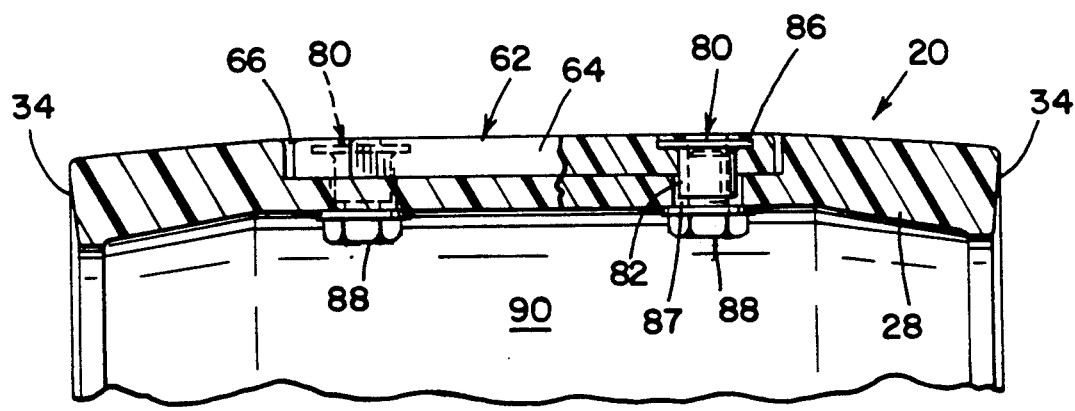

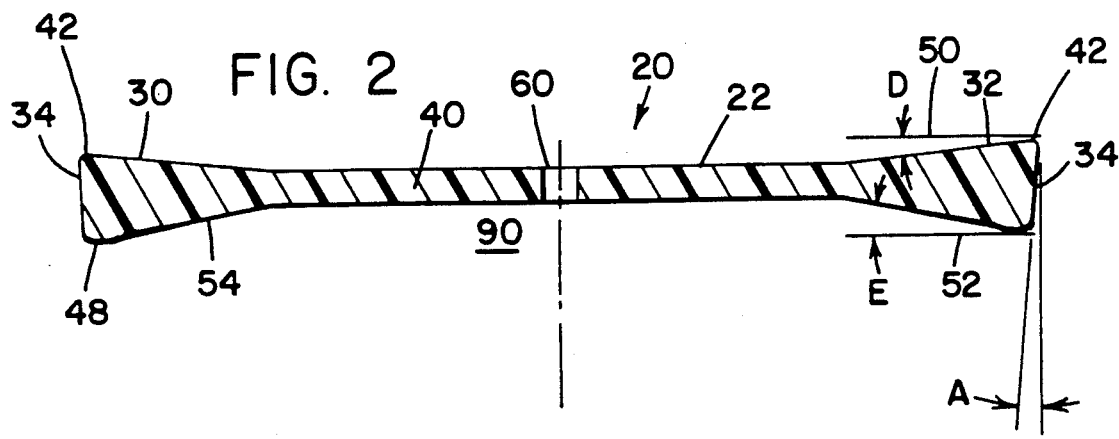
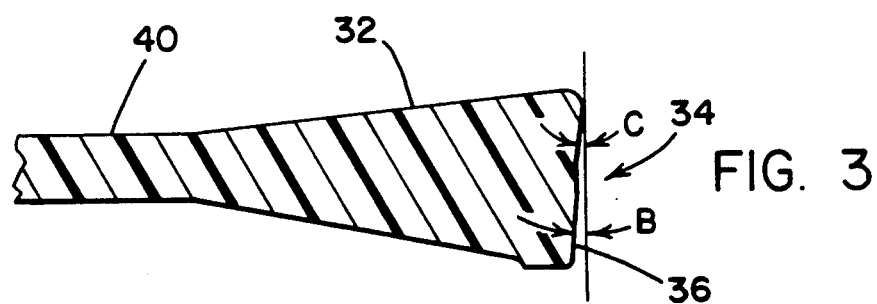
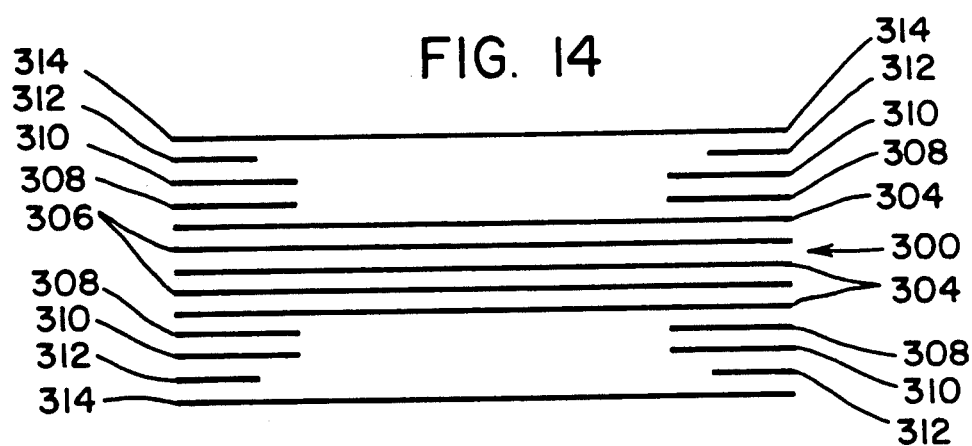

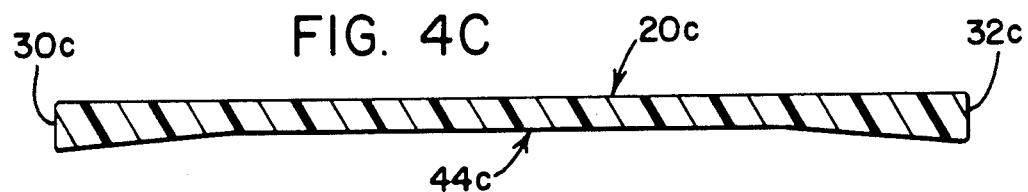
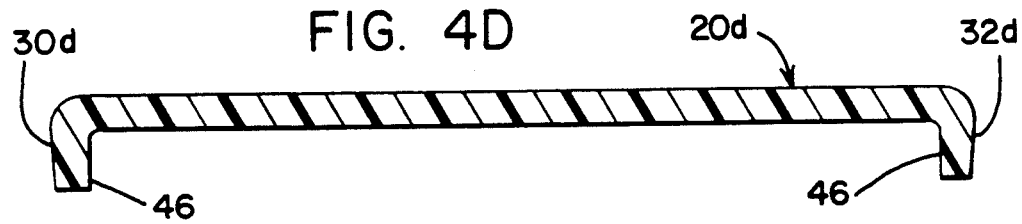
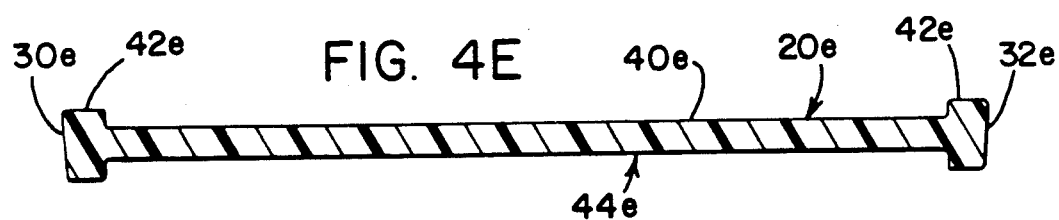
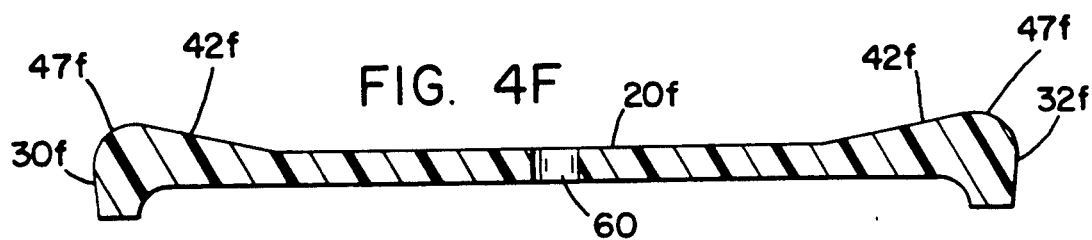

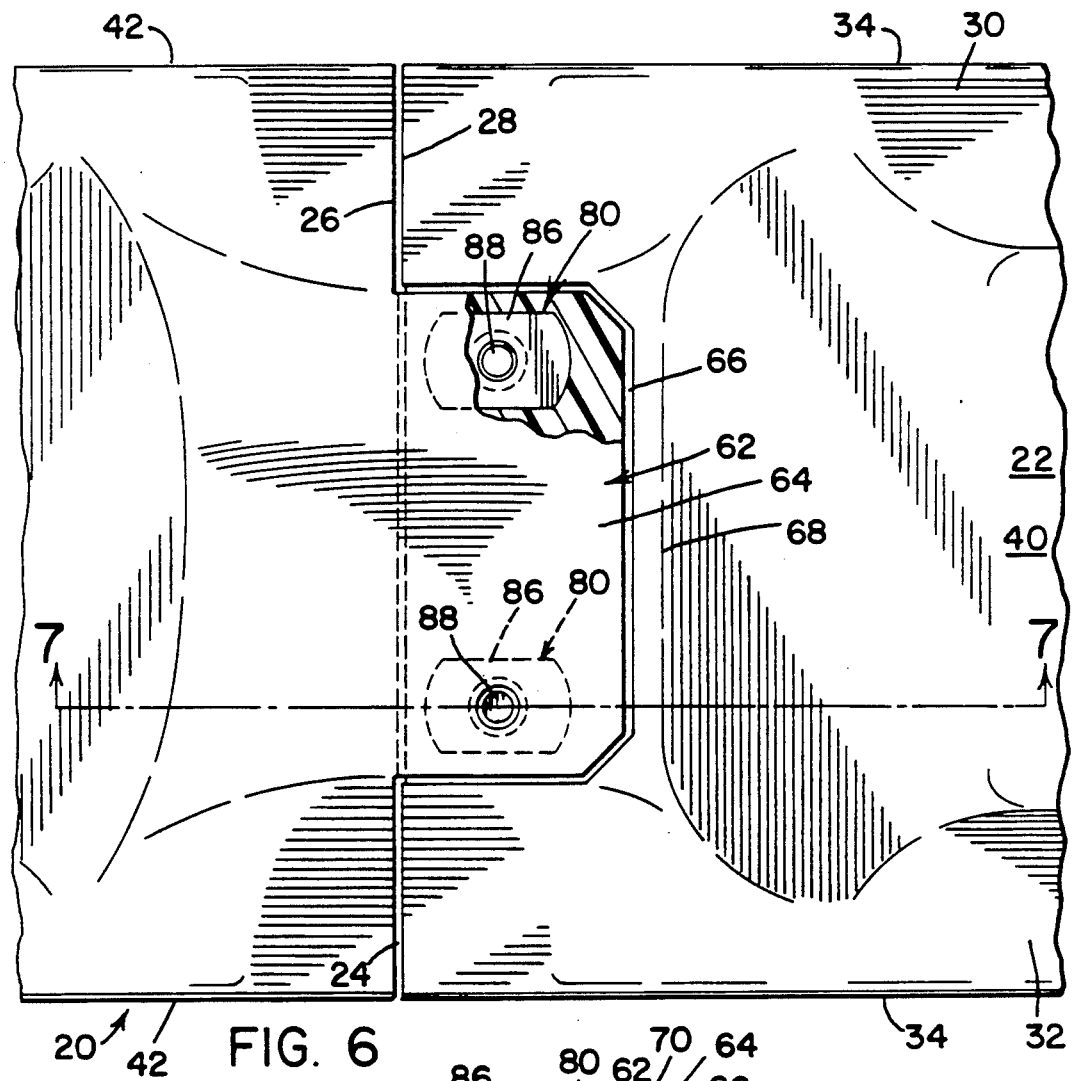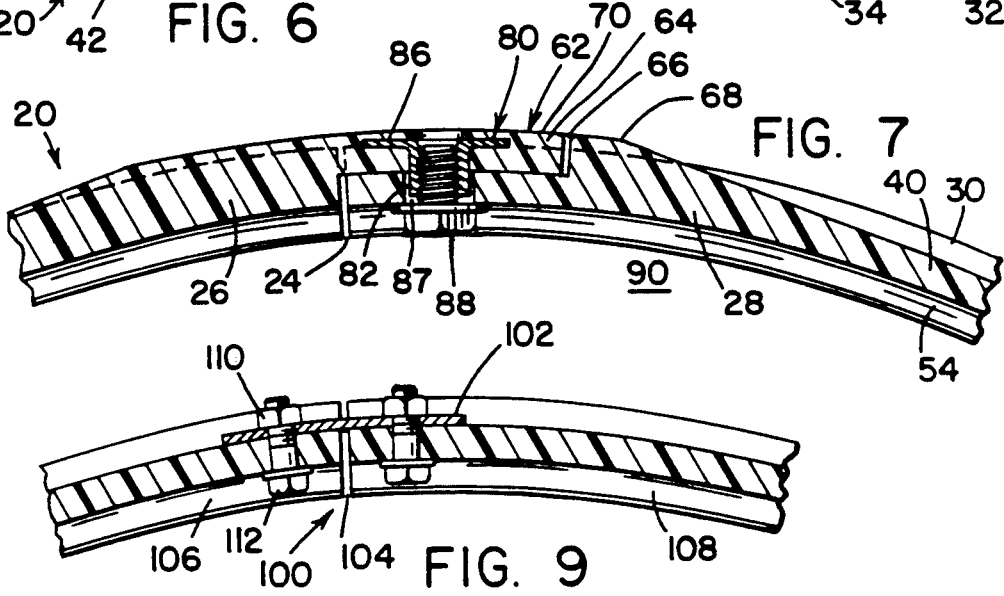

BEAD RETAINER

The application is a continuation of Application Ser. No. 07/348,832 filed May 8, 1989, now U.S. Pat. No. 5,000,240.

BACKGROUND OF THE INVENTION

This invention relates to a bead retainer which is capable of maintaining the beads of a tire in contact with the flanges of a rim. More particularly, this invention relates to a tire and rim assembly having a device that enables the beads of a tire to be held against the flanges of a multi-piece rim. Still more particularly, this invention relates to a device for improving the low pressure travel performance of a tire/rim assembly when used with or without a central inflation system. This invention also relates to a fastening means for fastening and unfastening a bead retainer device.

As used herein, the bead retainer, also known as a bead lock and/or a bead spacer is a structure that is used to maintain the beads of a tire in contact with the flanges of a rim. Preferably, the beads of a tire are not only held in contact with the flanges, but also are not generally subject to rotation with respect to the flanges. The bead retainer according to the invention herein, is not to be considered a run-flat insert. For use in this specification, a run-flat insert is considered to be a device for use inside a pneumatic tire to support the weight of the vehicle in the event the tire is deflated. Although the bead retainer device may be used under conditions of low or zero tire pressure to enhance the tire's travel performance, the bead retainer device is not intended to support the weight of the vehicle in such conditions.

A bead retainer device can however improve the run-flat characteristics of a tire to a certain degree by keeping the beads of a tire in place. Without the bead retainer device the beads of the tire would pull away from the rim bead seat and would be quickly damaged by the rim during travel of the vehicle. Therefore, by keeping the bead seated on the rim there is less chance of tire failure in this manner Bead locks have also begun to be used with systems known as central tire inflation systems In a central tire inflation system, air pressure can be either added to or taken from the tire cavity to improve the ground travel characteristics of a tire depending upon the surfaces encountered. For example, reducing the air pressure within a tire when the vehicle is traveling over soft, marshy, or sandy ground will increase the footprint of the tire thereby improving traction and flotation. Therefore, systems have been developed in order to compensate for the different types of surfaces or ground conditions encountered. A tire may be taken from a normal inflation pressure to a very low inflation pressure. As used herein, a very low inflation pressure is one on the order of about 0.7 to 1.0 BAR. The tire can then be inflated back to the normal inflation pressure by pumping air back into the tire cavity. Without a means for retaining the bead portion of the tire against the flanges of the rim, the beads would become unseated at very low inflation pressures thereby causing a complete deflation of the tire which would not allow for its later reinflation.

Bead retainers can also help keep the beads seated when the tire is subjected to off-road conditions. For example construction vehicles and such are subjected to conditions wherein side forces tend to try to pull the beads off the rim and deflate the tire. Bead retainers are also helpful when a tire is subjected to extreme changes in temperature. In that the inflation pressure of a tire varies as a function of temperature, the beads of a tire may become unseated when the ambient temperature becomes very cold, causing the inflation pressure to drop. This can occur especially during rapid temperature changes during the winter and especially in the arctic regions.

Various bead retainers have been tried in order to keep the beads against the rim. For example U.S. Pat. No. 4,558,728 to Forneris proposes the use of an elastomeric material located between the bead portions of a tire and having a reinforcement member contained in the elastic material in order to keep it seated on the rim. Another device that has been used in order to lock the beads to the rim of a tire is taught in U.S. Pat. No. 2,383,577 to Zarth. This device is an annular ring comprising metal that is fastened together by a kinamatic hinge structure. This device is expensive to manufacture in that it requires rolled edges and a complex hinge structure. This device, being comprised of metal is also fairly heavy.

The problem with most if not all prior art devices has been weight. One of the prime concerns of a tire/rim assembly is the total weight of such an assembly. Any additional weight to an assembly has a negative effect on the vehicle as a whole, one such effect being the reduction in fuel economy. The total weight also is reflected in how easily it is to install and remove the assembly.

Another problem that has been associated with bead retainer devices has been the difficulty in which they can be mounted and dismounted within the tire and onto the rim assembly. Some one-piece hoop-like elastomeric members that have been used for bead-lock devices are pre-tensioned such that they have an internal diameter that is equal to or less than the external diameter of the rim, thereby clamping itself to the rim. In that the diameter is equal to or less than the diameter of the rim the device must be stretched and expanded over the rim in order to install it. Other elastomeric devices that have diameters that are equal to the rim generally must be compressed by a machine and then banded together with a tie or other banding material. The banded together bead retainer is then forced between the beads of the tire and once inserted after much prying and force is allowed to return to its original shape by removing the banding material. Another disadvantage of an elastomeric bead retainer device is that they generally are axially compressible, thereby requiring the width of the bead retainer to be from at least 7 to 10% greater than the distance between the beads when mounted on a rim in order to compensate for the device taking a compression set and allowing the bead portions to become unseated. The extra axial width therefore imparts added weight to the device.

SUMMARY OF THE INVENTION

It therefore is an object of the invention to provide a bead retainer which is capable of maintaining the beads of a tire in contact with the flanges of the rim.

It is another object of the invention to provide a bead retainer for a tire which is capable of being easily mounted and dismounted therefrom, manually without the use of complex machines and/or other special tools.

It is still another object of the invention to provide a bead retainer which is capable of being installed manually by one individual in a relatively short time period.

It is still further another object of the invention to produce a bead retainer which is relatively easily manufactured.

It is still another object of the invention to provide a means for easily locking and unlocking the bead retainer together.

It is still another object of the invention to provide a tire/wheel assembly that is capable of use with a central inflation system.

It is still further another object of the invention to maintain the beads of a tire in contact with the flanges of the tire and to further prevent the rotation of the tire with respect to the rim at very low inflation pressures.

It is a feature of the invention that the bead retainer is an annular ring.

It is also a feature of the invention that the bead retainer is manually deformable in the axial direction.

It is further a feature of the invention that the bead retainer is manually deformable in the circumferential direction and in the axial direction.

It is further a feature of the invention that the bead retainer is substantially incompressible in the axial direction.

It is still further a feature according to one embodiment of the invention that the bead retainer is a composite material.

It is still further a feature according to one embodiment of the invention that the bead retainer comprises a polyester resin composite.

It is still further a feature according to one embodiment of the invention that the bead retainer comprises a thermoset plastic reinforced with fiberglass.

It is still another feature that the device can be spirally inserted and removed from the beads of a tire.

It is an advantage according to one embodiment of the invention to be able to manually mount and dismount the bead retainer utilizing such common tools as a screw driver (or pry bar), a hammer, and a wrench.

It is another advantage according to one embodiment of the invention that the bead retainer is light in weight.

It is another advantage that the bead retainer does not have to be compressed by a machine before insertion into the tire.

It is still another advantage that the bead retainer does not fail due to normal tire operating temperatures encountered during operation at low tire inflation pressures as rubber.

These and other objects, features, and advantages can be accomplished by a bead retainer comprising an annular body having a substantially transverse split therein, forming first and second ends, a pair of axial ends for engaging axially outwardly against beads of a tire, and being manually deformable in the axial direction while being substantially incompressible in the axial direction: and a fastening means carried by one of said first or second ends for releasably securing the first and second ends together.

The above may also be further accomplished by a bead retaining device for seating beads of a tire against flanges of a multi-piece rim comprising:

a ring body having a substantially axial split forming first and second circumferential ends, a pair of axial ends for engaging the beads of a tire, the ring body having a minimum inside diameter at each of its axial edges and a larger inside diameter in its axially central portion;

a fastening means for securing and unsecuring the first and second circumferential ends of said body together;

the ring body being manually deformable when the first and second circumferential ends are not fastened to one another, into a helical configuration for insertion between the tire beads, the diameter of the ring body being manually deformable to a diameter which is smaller than the diameter of the tire beads, the ring body also being manually deformable in the axial direction and being substantially manually non-deformable when the first and second circumferential ends fastened together.

The above may further be accomplished by an assembly comprising of a multi-piece rim having a cylindrical base, a pair of axially opposed bead seating surfaces with bead retaining flanges extending radially outwardly from the axial outer ends of the bead seating surfaces, a tire mounted on the rim and having a crown portion, a pair of sidewall portions extending radially inwardly from the crown portion to a bead portion, each bead portion disposed adjacent to a bead seating surface and the respective bead retaining flange of the rim, and a bead retaining device disposed between the bead portions for retaining the bead portions of the tire in engagement with the bead seating surfaces and in engagement with the bead retaining flange, the bead retaining device comprising:

a ring body having a substantially axial split forming first and second circumferential ends, the ring body having a minimum inside diameter at each of its axial edges and a larger inside diameter in its axially central portion, an aperture through the central portion for permitting the passage of air, a pair of axial opposed bead sustaining surfaces at each axial edge of the ring body engaging the bead portions of the tire, a fastening means for releasably attaching the circumferential ends of the ring body together, the fastening means attached to one of the circumferential ends and releasably attached to the other circumferential end, and the axially central portion of the bead retaining device being radially spaced apart from the cylindrical base of the rim.

BRIEF DESCRIPTION OF THE DRAWINGS

The following is a brief description of the drawings in which like parts may bear like reference numerals and in which:

FIG. 1 is a perspective view of a bead retainer device showing a preferred embodiment of the invention:

FIG. 2 is a cross sectional view of the bead retainer device of FIG. 1 taken along line 2—2:

FIG. 3 is a partial sectional view of an alternate embodiment of an axial end of a bead retainer according to this invention:

FIGS. 4A–4F are cross-sectional views of alternate embodiments of a bead retainer according to the invention, and wherein FIG. 4F is a cross-sectional view of the bead retainer device of FIG. 10 taken along line 4F-4F;

FIG. 5 is a partial cross sectional view of the fastening means of the bead retainer device of FIG. 1 taken along line 5—5:

FIG. 6 is a fragmentary plan view view of the fastening means of the bead retainer device of FIGS. 1 and 5;

FIG. 7 is a cross-sectional view of the fastening means of the bead retainer device in the fastened position taken along section line 7—7 of FIG. 6;

FIG. 9 is a cross-sectional side view of a fastening means according to an alternate embodiment of the invention;

FIG. 14 is a cross-sectional schematic illustrating the fiberglass lay up of the bead retainer device according to one embodiment of the invention.

DESCRIPTION OF THE INVENTION

Figure 11:
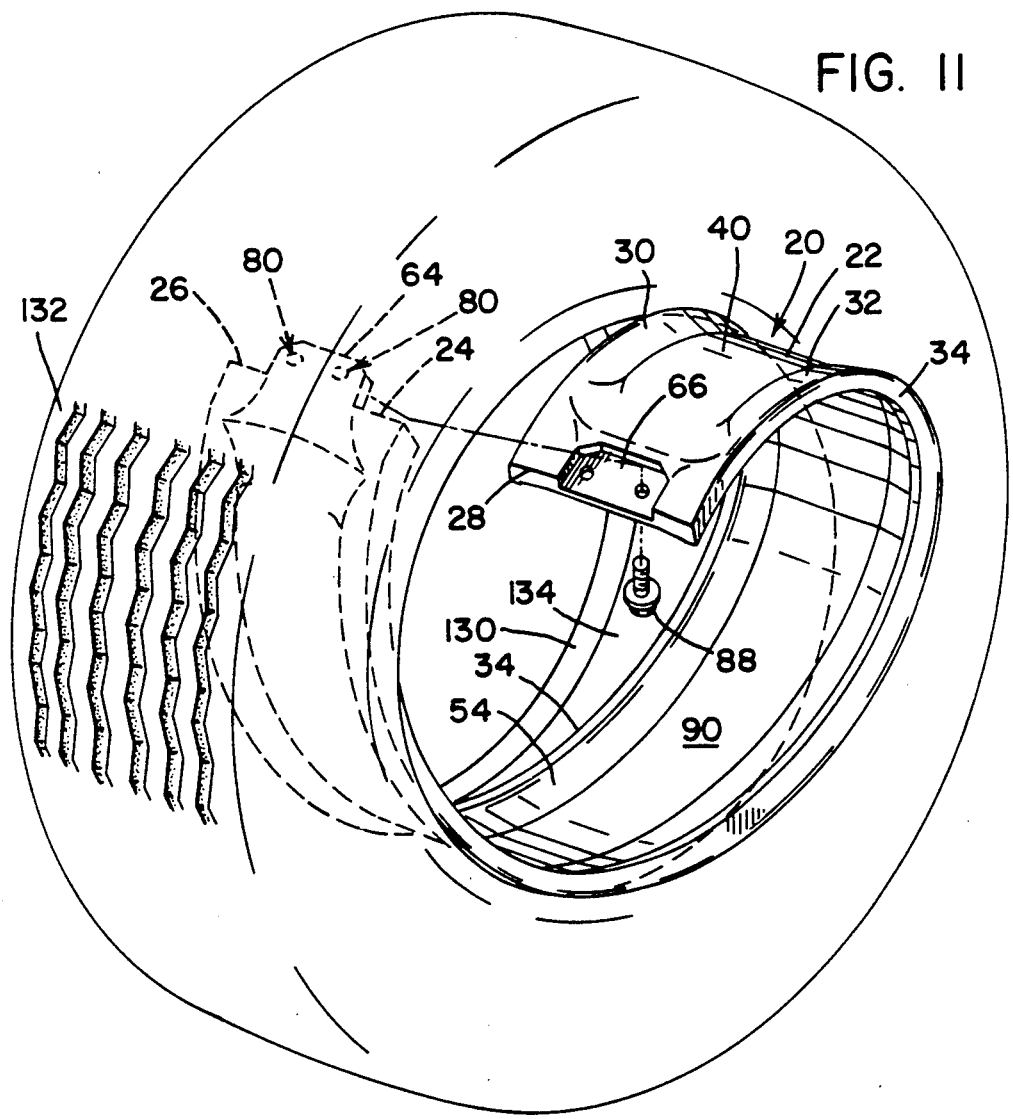
FIG. 11 is a perspective view of one method of installing a bead retainer device into a tire according to one embodiment of the invention.
Figure 8:
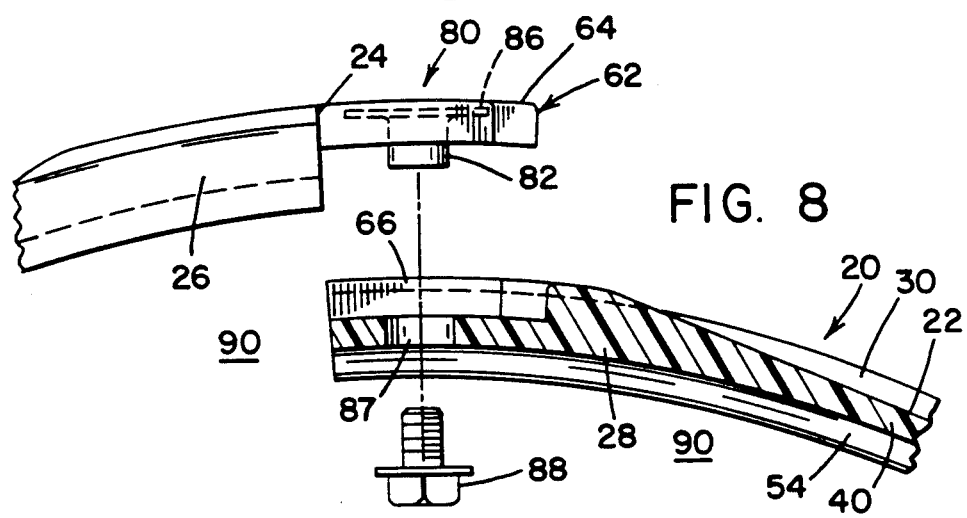
FIG. 8 is a partial cross-sectional side view of the fastening means of the bead retainer device of FIGS. 1, 5, 6, and 7 in the unfastened position.

The following definitions are applicable to this specification, including the claims and wherein:

"Axial" and "axially" are used herein to refer to lines or directions that are parallel to the axis of rotation of the tire or the bead retainer device.

"Bead" means that part of the tire comprising an annular tensile member wrapped by cords and shaped, with or without other reinforcement elements such as flippers, chippers, apexes, toe guards and chafers, to fit the design rim.

"Inner" means toward the inside of the object and "outer" means toward its exterior.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Radial" and "radially" are used to mean directions radially toward or away from the axis of rotation of the tire or the bead retainer device.

Referring now to FIGS. 1 and 2, there is illustrated a bead retainer device according to one embodiment of the invention and shown generally as reference 20. The bead retainer 20 has an annular body 22 which in the preferred embodiment is a one-piece structure having a substantially transverse or axial split 24 therein thereby forming first 26 and second 28 circumferential ends. Transverse split as used herein means a split which extends from one axial end 30 to the other axial end 32. The axial ends 30, 32 engage axially outwardly against the beads of the tire for seating the beads against the flanges of a rim. The axially outer surface 34 of each axial end 30, 32 may be formed such that they will more properly mate with the inner surface of the bead portion of a tire. For example, the axially outer surface 34 may be inclined at an angle "A" with respect to a line parallel to the equatorial plane of a tire in the range from 0° to about 7°, with the more preferred angle being about 5°. This angle however, may vary depending upon the bead of the tire and the rim upon which the tire and the bead retainer are mounted. For example, it may be more preferable to have the axially outer surfaces inclined at a compound angle, meaning inclined at a first angle, such as 5° for a portion of its radially outward surface and inclined at a second angle, such as 7° for another portion of its radially outward surface.

For example, referring to FIG. 3 there is illustrated a fragmentary view of an axial end of a bead retainer having an axially outer surface 34 having a compound angle. The axially outer surface is first inclined at an angle "B" over a portion 36 of the axially outer surface 34 and then inclined at a greater angle "C" of the remaining portion 38 of the axially outer surface 34. It is believed that in this arrangement the more radially outer portion of the bead retainer will be able to more properly mate with the bead of the tire and thereby exert greater force against it.

Alternatively, it may be preferable to have the axially outer surfaces possess an arc to better mate with the bead portion of the tire.

The cross-section of the bead retainer may have a number of different configurations while still conforming to the spirit and scope of the invention. Referring to FIGS. 2, and 4–9, there is illustrated just several different cross-sections. For example the bead retainer 20a may be substantially rectangular or trapezoidal as shown generally at FIG. 4. In order to provide greater surface area at the axial ends to compress against the bead portions of a tire the axial ends 30b, 32b may be extended radially outwardly from the central portion 40b of the bead retainer 20b to form ridges or flanges 42b.

In some applications the rim and/or the inflation means and/or the fastening means may require that bead retainer to have a cross-section which is concave, that is one in which at least a portion is disposed a distance from the outer surface of a rim. For example the bead retainer 20c having a generally rectangular cross-section may have its axially outer ends 30c, 32c extending radially inwardly to provide means for spacing the radially inner surface 44c from a rim when mounted. In like manner the bead retainer of FIG. 4B could be inverted such that the ridges or flanges become legs 46 of the bead retainer 20d. The bead retainer 20e may also have a cross-section that is substantially an "H". In this configuration the central portion 40e is spaced from the rim of a tire while also having axial end portions 30e, 32e which provide good contact with the bead portions of a tire. The "H" cross-section combines the spacing from the rim with the ridges or flanges 42e into one design.

The "H" cross-section can be further modified by reinforcing the ridges or flanges. For example, axial ends 30f, 32f can be reinforced by providing material tapering radially inwardly from the flanges 42f to the central portion 40f of the bead retainer 20f. The radially outer surface of the flanges may be curved 47f in order to prevent the bead retainer 20f from gouging the bead portion as the bead is flexed against the bead retainer.

Referring again to FIG. 2 there is illustrated the preferred cross-section of the bead retainer 20. The cross-section of this embodiment is substantially a "bow tie,"

the "H" cross-section having been further modified to not only reinforce the flanges but also the lower legs of the "H". The axial ends 30 and 32 have been reinforced as in FIG. 4F by material tapering radially inwardly from the flanges 42 to the central portion 40. In like manner, the radially inner ends 48 of the axial ends 30, 32, are reinforced with material that tapers radially outwardly to the central portion 40. The reinforcement is tapered in order to reduce the amount of material, and subsequently the amount of weight added to the bead retainer. It is generally of utmost importance to provide a bead retainer that will not only lock the beads but is light in weight. If the flanges 42 were not reinforced with material that tapers inwardly but extended straight across from one flange to the other the resulting cross-section would be similar to that of FIG. 4C. Although other ways could be employed to reinforce the flange portion, bead retainers have been built tapering from the flange at an angle "D" of about 6° to about 8° with respect to a line parallel to the axis of rotation 50. While the radially inner ends have been built having a general taper, angle "E" of 11° from about 10° to about 11° respect to the axis of rotation 52. These bead retainers were built for 14.00R20 tires. In practice the exact amount of taper or reinforcement may vary depending upon the material of the bead retainer used and the size of the tire to be installed on. The inner taper 54 not only adds reinforcement to the axial ends but also allows for easier removal from the mold during construction as explained below.

Now referring again to FIGS. 1 and 2 and also in conjunction with FIGS. 5 through 8, the bead retainer 20 is further provided with at least one aperture or hole 60 for allowing the passage of air therethrough and a fastening means 62. The fastening means 62 is attached to the first circumferential end 26 and releasably secures the first circumferential end 26 to the second circumferential end 28. Preferably the fastening means 62 has a tab means 64 attached to and extending from the first circumferential end 26, which will overlap the second circumferential end 28 when in the closed position.

Preferably when in the closed position the tab means 64 will be located in or fit into a recessed portion or pocket 66 located in the second circumferential end 28. The recessed portion may be formed by blending material from the central portion 40 radially outwardly until the radially outer surface 68 of end 28 is substantially flush with the radial outer surface 70 of the tab means 64. This blending provides a smooth transition which is free from sharp and exposed edges. This is important if the bead retainer device is to be used on conjunction with tires having an inner tube. If an inner tube is used, any sharp edges or protrusions in the radially outer surface could cause excess abrasion and or failure of the inner tube. Therefore, recessing the tab means in a pocket as described above is believed to eliminate this potential problem. However, if the device is to be used with tubeless tires than the tab means does not have to be recessed.

Figure 10:
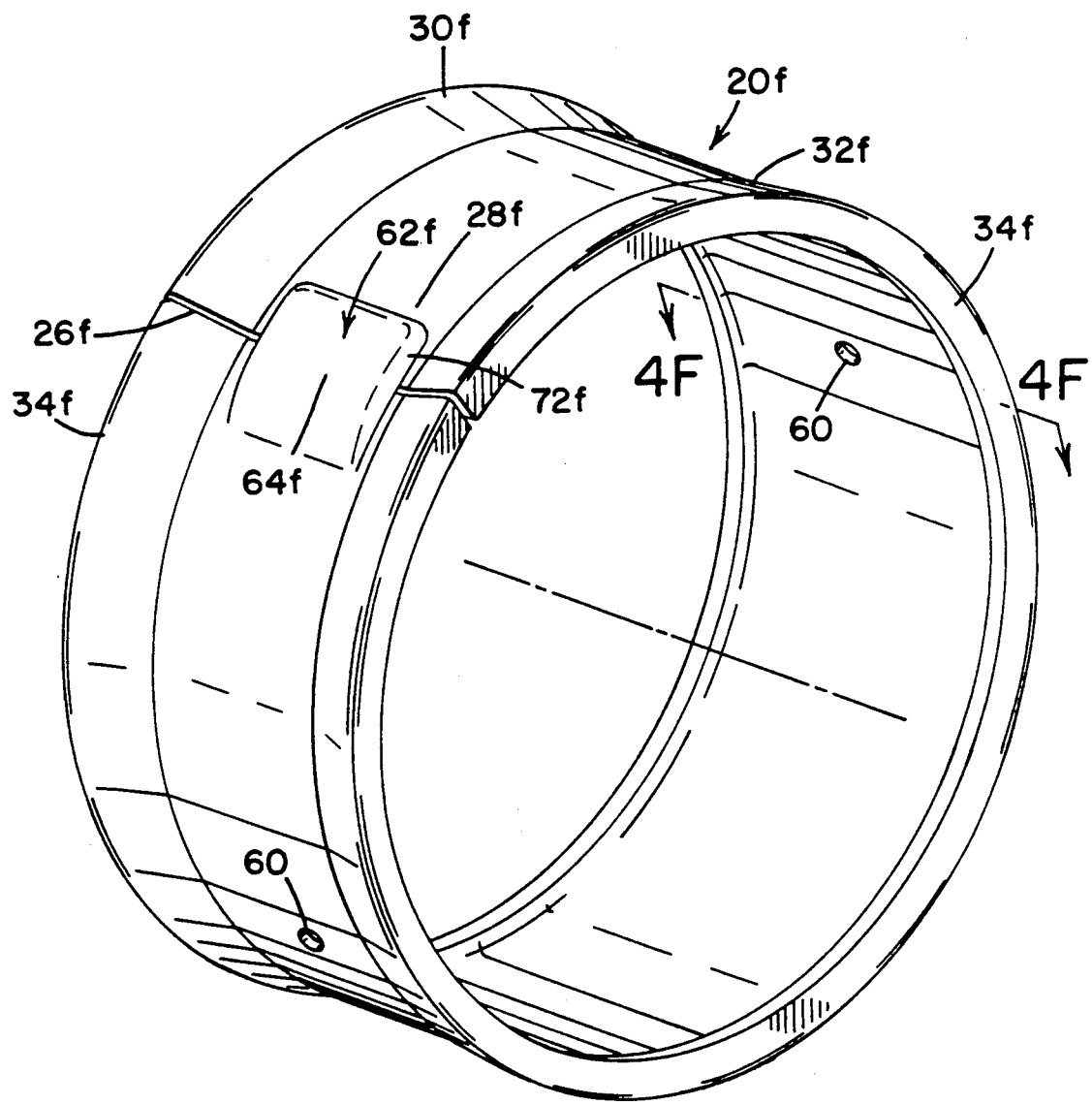
FIG. 10 is a perspective view of an alternate embodiment of a bead retainer device according to the invention.

For example, referring to FIG. 10, there is illustrated a bead retainer, shown generally at 20f wherein the tab means 64f extends from a circumferential end 26f to the other 28f and is not recessed into a pocket. This fastening means 62f may still be suitable for use with inner tubes by rounding the radially outer edges 72f of the tab means 64f.

Referring again to FIGS. 1, and 5 through 8, the fastening means 62 is further provided with a means for releasably securing and unsecuring the tab means 64 to the second circumferential end 28. In the preferred embodiment a tee nut 80 is attached to and extends radially inwardly from the tab means 64. A tee nut 80 is a fastener which has an elongated portion 82 having a bore therethrough with internal threads 84. Extending perpendicular from one end of the elongated portion is a base 86. In cross section the tee nut has substantial a "T" configuration. The base 86 provides a means for rigidly securing the tee nut to another object. In simplified terms, a tee nut is essentially a nut affixed to a mounting base. While the base of the tee nut could be attached to the radially outer surface of the tab means 64 of the bead retainer it is preferred to imbed it within the tab means 64. The second axial end 28 has a hole or apperature 87 which the elongated portion 82 of the tee nut 80 extends into when in the closed position. A bolt is then screwed from the inner cavity 90 into the tee nut to secure the ends 26 and 28 together into a closed position. When installed on a rim, the head of the bolts 88 are in close proximity or in contact with the outer surface of the rim. This helps prevent the bolts from loosening and backing out of the tee nut. The fastening means, when in the closed position prevents the bead retainer ends 26 and 28 from moving and separating both circumferentially and radially.

The fastening means may only have to prevent the circumferential movement but not the radially outward movement. It is believed that the axial forces coupled with the fact that the bead retainer is mounted on a rim having an inextensible diameter will prevent the bead retainer from coming apart. In this case a stud extending from the tab means, similar to the elongated portion of the tee nut may be sufficient. However, the stud could extend through the hole 87 and be fastened with a washer and cotter pin assembly. The tab means 64 may be an integral part of the first end 26 portion of the bead retainer or it could be a separate piece secured thereto. For example the tab means could be secured to the first end portion 26 by tee nuts such as the second end portion 28 is. In other words the first end portion could be symmetrical about the axial split 24 that would look like the second end portion.

Referring to FIG. 9, there is an alternate embodiment of the fastening means as shown generally at reference numeral 100. The tab means 102 extends across the axial split and is releasably affixed to either circumferential end 106, 108 of the bead retainer. The tab means 102 may be secured to the ends by nuts 110 and bolts 112. For example, If the tab means is a metal plate the nuts can be secured to the tab means by tack welding. This allows for securing one end with a bolt and then removing only the other bolt to unsecure the ends.

The fastening means provides for a means of releasably securing the first and second ends 26, 28 together. As used herein, and including the claims releasably securing means a method of joining, attaching, securing, etc. one part to another by non-permanent means and then being able to disjoin, unsecure, remove, etc. the parts again. The above operation being repeatable, this would not include securing or fastening which is meant to be permanent, such as by glueing, cementing, welding, etc.

In that the fastening means 62 adds additional weight to the bead retainer at one location a compensation weight 120 has been added, diametrically opposite the fastening means, for example as illustrated in FIG. 1. The compensating weight is a means to compensate or balance the weight of the fastening means 62 and thereby to better balance out the bead retainer and eventually the tire/rim assembly.

The bead retainer device must be flexible enough to be inserted into and removed from the beads of a tire while being rigid enough to keep the beads of the tire in position against the flanges of the tire. As such the bead retainer device is capable of being both manually deformable in the axial direction and manually deformable in the circumferential direction when the first and second ends 26, 28 are unsecured together. For example referring to FIG. 11 there is illustrated one method of installing a bead retainer device according to one embodiment of the invention. The bead retainer 20 is shown as being spirally inserted between the beads 130 of a tire 132 and into the tire's inner cavity 134. The bead retainer has been axially deformed by axially moving the circumferential ends apart from one another, thus deforming the annular body into a helical or spiral configuration. The bead retainer must therefore be flexible enough that a man, grasping either end 26, 28 of the bead retainer 20 could manually move the ends apart such that the first end 26 could be inserted within the beads. Once the first end 26 is inserted the remaining portion of the bead spacer is spirally fed into the tire until the second end 28 is finally fed therein. When the device is fully inserted, it is fastened together and positioned between the beads so that the tire/bead spacer assembly can be mounted on a rim.

Figure 12:
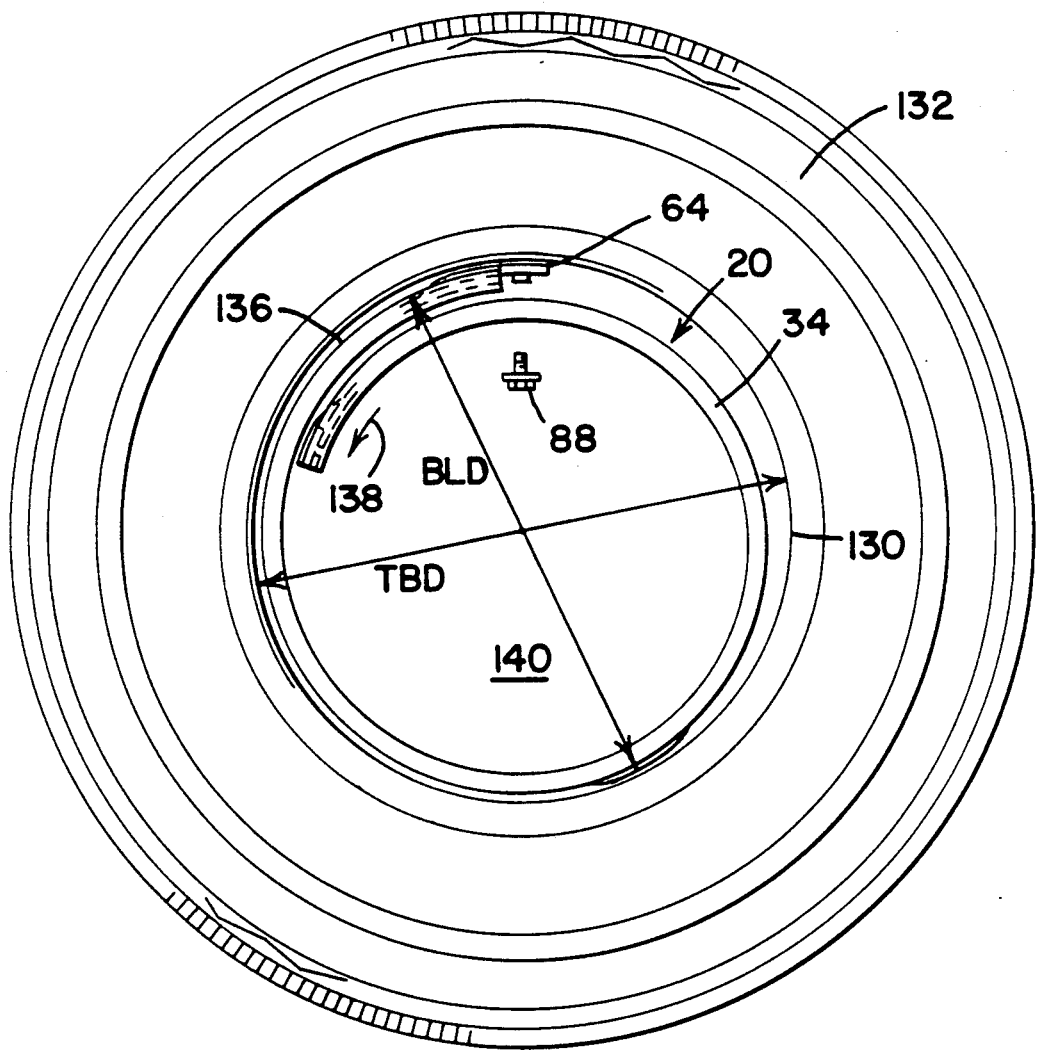
FIG. 12 is a side view of a tire and a bead retainer device according to one embodiment of the invention illustrating an alternate method of installing the bead retainer within a tire.

Alternatively referring to FIG. 12, the bead spacer can be installed according to another method according to the invention by collapsing the bead retainer device. The bead retainer 20 can be circumferentially deformed by collapsing the diameter of the bead retainer to a diameter "BLD" which is less than the diameter "TBD" of the opening 140 of the bead 130 of the tire 132. The bead spacer can be collapsed by manually moving the first circumferential end 26 to overlap the second circumferential end 28. A manual force applied to the outer surface 136 of the bead retainer and directed radially inwardly causes the ends 26 of the bead spacer to circumferentially move past one another, shown by arrow 138, thereby causing the bead retainer to become deformed in the circumferential direction. Once the bead retainer diameter "BLD" becomes less than "TBD" the bead retainer can be slid into the opening 140. Once within the opening the bead retainer can be installed between the beads of the tire. It is preferred that the bead retainer device should be flexible enough that a man can both manually collapse the diameter and keep it as such, without having to resort to restraining the device by tying, banding, etc. during insertion. In other words, it is preferred that a man can physically hold the device in a collapsed state until within the opening 140. Once within the cavity an individual can let go and it will return to its original configuration without having taken a permanent deformation.

In either method, once the bead retainer has been positioned within a tire, the fastening means can be engaged to secure both ends together, thereby preventing the axial and circumferential deformation.

The bead retainer can be readily removed from the tire using either method illustrated above carried out in reverse order. However, it appears that it is quicker and may be easier to remove the bead retainer by the spiraling method.

For example, ends of the bead retainer are first unfastened, such as by removing the screw. A sharp blow by the hand or other means can then be applied to the radial inner surface of the bead retainer to cause the ends to disengage from one another. One of the free ends can then be pulled out, spiralled, to remove the remaining portion of the bead retainer.

It is readily apparent that a bead retainer device could be assembled from two or more different pieces and secured together by fastening means without departing from the spirit and scope of the invention.

Figure 13:
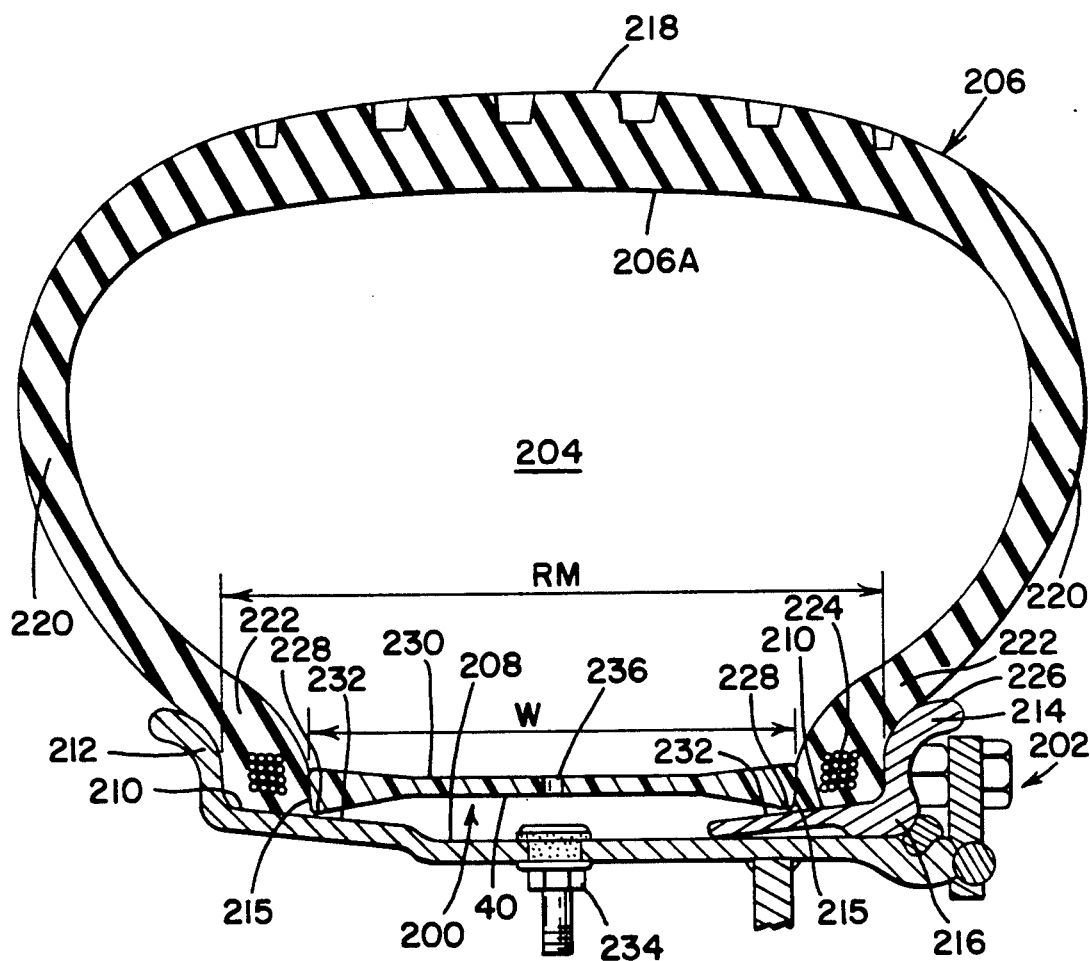
FIG. 13 is a cross-sectional view of one embodiment of the invention illustrating a tire mounted on a multipiece rim and a bead retainer device mounted within the cavity formed by the rim and the tire and engaging the bead portions of the tire.

Referring now to FIG. 13 there is illustrated a bead retainer 200 according to an embodiment of the invention mounted on a rim 202 and within the cavity 204 of a tire 206 formed by the rim 202 and an inner surface 206A of the tire.

The rim 202 is a multi-piece rim having a cylindrical base 208 and a pair of axially opposed bead seating surfaces 210 with bead retaining flanges 212, 214 extending radially outwardly from the axial outer ends 216 of said bead seating surfaces 210.

The tire 206 which is mounted on the rim 202 has a crown portion 218 and a pair of side portions 220, each extending radially inwardly from the crown portion 218 to a bead or bead portion 222. Each bead portion 222 is adjacent to each bead seating surface 210 and the respective bead retaining flange 212, 214 of said rim 202. Each bead portion 222 has a bead bundle 224 located therein.

The bead retaining device 200 is located between the bead portions 222 for retaining the bead portions 202 of the tire 206 in engagement with the bead seating surfaces 210 and in engagement with the bead retaining flanges 212, 214.

The bead retainer has an axial width "W" which is equal to or greater than the separation between the bead portions of the tire when they are mounted on the rim. In other words the bead retainer should have a width "W" which is greater than or equal to S, wherein S is defined as:

RM - BW1 - BW2 and wherein RM is the distance between the flanges and BW1 and BW2 is the bead width of the first and second bead portions. It is preferred that the "W" is less than 7% greater than S with a more preferred range being from 1%-5% greater than S with a more preferred range being from about 1% to about 2.5%. In embodiments of the bead retainer which have different widths depending upon the point of measurement, such as those that would result from inclining the axially outermost surfaces 215 to mate with the bead portions, the width W is considered to be the mean axial width.

In order to maintain the smallest axial widths "W" as possible, the bead retainer should deform as little as possible in the axial direction when installed. As a result, it is preferred that the bead retainer be substantially incompressible in the axial direction. Substantially incompressible as used herein and in the claims means that in the fastened position the bead retainer compresses less than about 1% of its axial width "W" for an axial force which is equal to the axial force that the device would encounter when mounted on a tire/rim assembly which is at normal load and normal inflation pressure. In other words the bead retainer should compress less than about 1% when installed in a tire/rim assembly which is at normal load and normal inflation pressure. It is even more preferred that the bead retainer device compresses less than one half of one percent of the axial width "W".

It is preferred that the bead retainer device 200 does not extend radially outwardly beyond the radial outer portion 226 of the rim flanges 212, 214, so that the bead retainer does not act as a run flat device. Preferably the bead retainer does not extend radially outwardly at the bead portions beyond a point equal to or less than the radially outermost portion of the bead bundle 224.

The bead retainer has an inner diameter which is substantially the same as or larger than the outer diameter of the rim. Preferably the inner diameter of the bead retainer is slightly larger. In other words the radially inner end 228 of the annular ring 230 is spaced a predetermined distance from the radially outer surface 232 of the rim 202.

The rim 202 may contain an inflation valve or inflation means 234 which allows for the passage of air to and from the tire 206. The holes 236 of the bead retainer 200 allow for passage of this air to and from the tire cavity 204.

To assemble the tire/rim/bead retainer assembly, the bead retainer is first installed between the beads of a tire as explained above. The tire/bead retainer is then assembled onto the multi piece rim. For example using a multi piece rim 202 having a removable flange 214 the tire/bead assembly lock is inserted onto the rim base with one bead portion engaging the non-removable flange 212. Once installed, the removable flange 214 is than attached to the rim and the assembly is then inflated.

The above bead retainer can be used with other different types of multi-piece rims, for example those which have two halves which are bolted together, and multi segmented rims.

In order to be light weight and flexible as described above, the annular ring of the bead retainer is comprised of a material which is non-metallic and which is non-rubber. The bead retainer could for example be comprised of a thermoset, a thermoplastic or other polymeric material. It is believed that the material used should be able to withstand temperatures in the range of about −50° F. to about 250° F. These temperature ranges can vary depending upon the application but it is evident that the material selected should be able to withstand the coldest temperatures expected to be encountered without becoming too brittle and therefore subject to cracking. In like manner the device should be able to withstand the temperatures induced, especially when the tire is being run at low inflation pressures, without causing deformation of the bead retainer. This is especially noteworthy if a thermoplastic is to be used. A thermoplastic by definition is a material which can be readily softened and reformed by heating and be re-hardened by cooling. Therefore, if a thermoplastic is to be used, the temperature at which the material softens should be higher than the highest temperatures at which the bead retainer will be subjected to. This is one reason why it is believed that the material should be able to not soften or deform below 250° F.

A thermoset in contrast, once formed into a solid cannot be remolded etc. Therefore, a thermoset material is believed to be the more preferred material, although the thermoset still must be able to withstand the operating temperatures without failure.

While some materials used may not require reinforcement, it is preferred at this time that the material used be reinforced with a strength member, such as for example fiberglass, KEVLAR TM, nylon, polyester, etc. For example, the bead retainer could comprise from about 30% to 60% fiberglass by total weight.

In the preferred embodiment bead retainers have been built comprising a polyester composite resin reinforced by fiberglass. The polyester composite is a blend of a unpromoted highly crosslinked vinyl ester resin containing styrene and a flexible, isophthalic polyester resin. The unpromoted highly crosslinked vinyl ester resin comprises from about 50% to about 90% by weight of the total resin of the composite. The greater the percentage amount of the vinyl ester resin used produces a higher heat distortion temperature while also producing a harder, less flexible composite. The isophthalic polyester resin adds or improves the flexibility of the composite.

The unpromoted highly crosslinked vinyl ester resin can be such as that manufactured by the Ashland Chemical Company, a Division of Ashland Oil, Inc., and manufactured under the Trademark Hetron TM 980 and set forth in their Technical Date sheet dated May 1987, and incorporated herein as a reference. As set forth in such Technical data sheet the vinyl ester resin has excellent impact strength, high heat resistance and high tensile elongation. The following physical properties of cured castings at 77° F. as set forth in said data sheet are set forth in Table 1 below:

TABLE 1

| Test | Value |
| --- | --- |
| Barcol Hardness | 35 |
| Specific Gravity | 1.150 |
| Flexural Strength, psi | 17,000 |
| Flexural Modulus, psi × $10^6$ | 0.47 |
| Tensile Strength, psi | 12,200 |
| Tensile Elongation, percent | 5.3 |
| Tensile Modulus, psi × $10^6$ | 0.47 |
| Heat Deflection Temperature, (°F.) | 250 |

Another material which has a higher heat resistance than the Hetron TM 980, and which is believed to also be usable in its place is Hetron TM D1222. The flexible, isophthalic polyester resin can be such as that manufactured by the Ashland Chemical Company, a Division of Ashland Oil Inc., and manufactured under the trademark AROPOL TM 7721 and set forth in their Technical Data sheet dated April 1981 and incorporated herein as a reference. As set forth in such data sheet the resin has typically 35% styrene and has excellent impact strength, outstanding toughness and tensile strength for a flexible resin and has high tensile elongation.

Bead retainers according to one embodiment of the invention have been built having from about 10% to about 20% being the flexible polyester resin and from about 80% to about 90% being the vinyl ester resin. The percentages being by weight of the total resin. This resin was then reinforced by fiberglass in the range from about 35% to about 50% by total weight of the bead retainer device, ie., the total weight of glass and resin.

It is believed that the bead retainer can be formed or manufactured using a variety of different methods such as for example Resin Transfer Molding (RTM) or through the use of Sheet Molding Compound. It being understood that the method of manufacturing is not to be limited to just these two methods. The preferred method at this time and in which bead retainer devices have been produced is the Resin Transfer Molding process.

In RTM, a continuous strand mat of fiberglass or preformed reinforcement is positioned on an open mold.

A matching mold half is mated to the first mold half and clamped together. A resin mix is then pumped into the cavity. The product is cured and the part removed from the mold.

Referring now to FIG. 14, there is illustrated a fiberglass layup shown generally at reference numeral 300 for use with the RTM process. The layup is a cross-section of the bead spacer shown generally in FIG. 2, although without provision for the air hole which can be drilled at a later time. The fiberglass layup 300 is placed in a mold which is shaped to the desired configuration. The layup 300 comprises layers of continuous stand mat fiberglass and layers of a higher member strength such as square woven fiberglass. The central portion of the bead space was formed by 3 layers of 24 ounce woven roving fiberglass 304 as manufactured by Fiber Glass Industries, Inc style No. 2454 that extends the entire axial width. Interspersed between the square woven fiberglass layers and extending the entire axial width is a layer of 1.5 ounce continuous strand mat 306 as manufactured by NICOFibers, Inc. Each leg and flange is formed by a first strip of continuous strand mat (CSM) 308 having a width less than the full width layers 304, 306 and located adjacent to a layer of full width woven roving fiberglass 304. A strip of square woven 310, having substantially the same width as the strip of continuous strand mat 308 is located between the strip 308 and another strip 312 of continuous strand mat having a width less than the other two strips. The final layer on each end is a full width layer of continuous strand mat 314.

Figure 15:
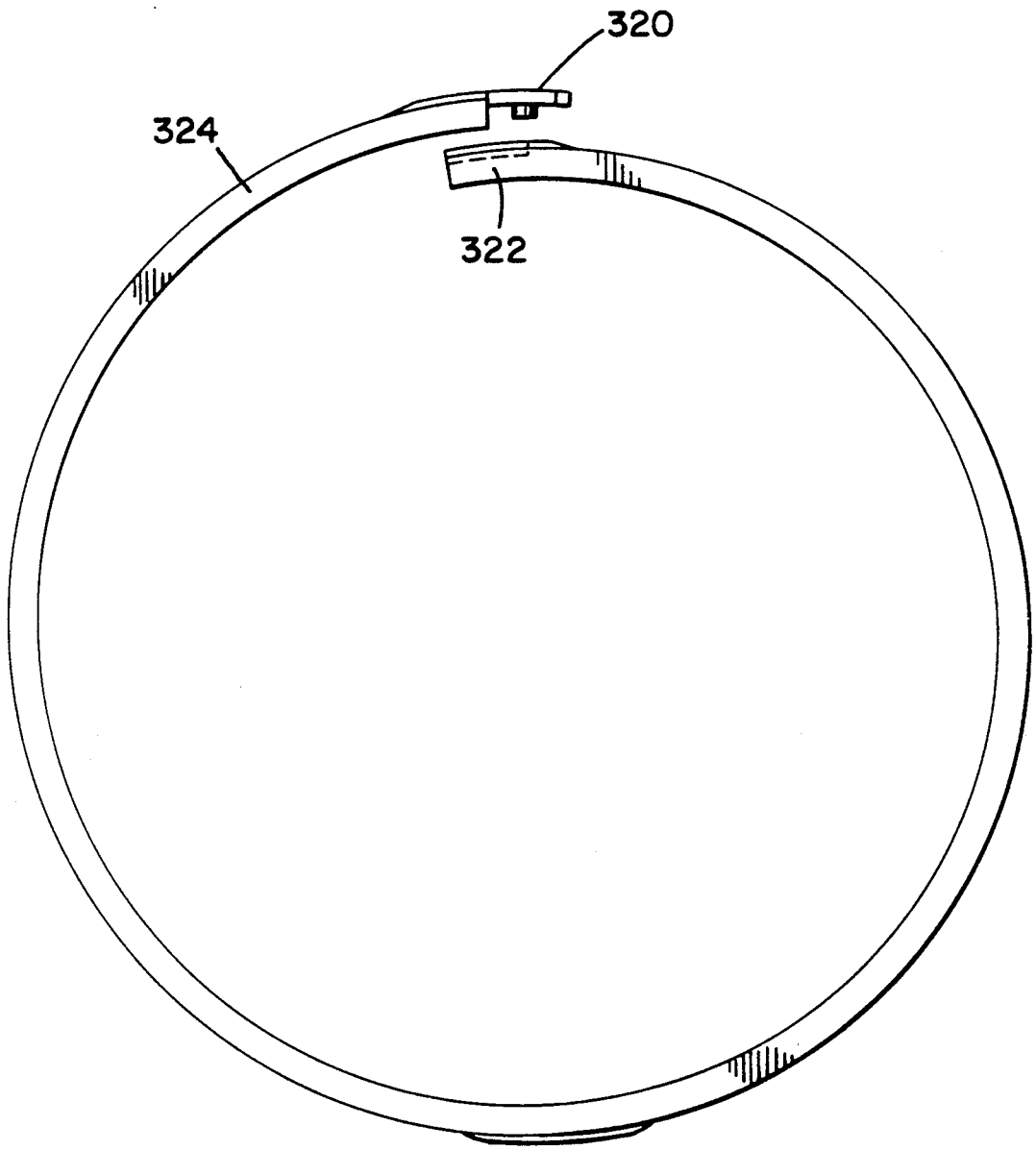
FIG. 15 is a side view illustrating one method of molding a bead retainer according to one embodiment of the invention.

Referring to FIG. 15, the bead retainer can be molded such that the circumferentiated ends 320, 322 overlap one another when viewed from the axial end. In other words, the annular member 324 can be formed to have a slight spiral or corkscrew shape. This not only is beneficial in the manufacturing of the part but also helps in collapsing the device for mounting or dismounting.

EXPERIMENT

A series of tests were performed to provide cold weather durability data and bead slip data. Testing was conducted in Alaska with ambient temperatures ranging from −38° F. to −4° F. (−39° C. to −20° C.). The bead retainer used was similar to that of FIG. 10 and designed to be used within a 14.00R20 tubeless tire on a 10-×20-inch diameter two piece take apart wheel. The average weight of three bead retainers was only 8.72 lbs.

Tires having the bead retainer installed therein were inflated to 40 PSIG cold pressure and mounted on a five-ton wrecker that had the weight of the rear axles adjusted to 23,880 lbs (5,970 lbs/tire) with a half tank of fuel. The tires were mounted on both ends of the intermediate axle and on the right rear position, control tires being mounted on the left rear position.

The tires were allowed to soak to the outside ambient temperature and then driven on paved roads for 800 miles with a maximum sustained highway speed of 50 mph, an average speed of 45 mph with an average temperature range of −25.5° F. varying from −20° F. (−29° X) to −38° F. (−39° C.). At the end of the test there was no bead slip encountered (ie movement of the bead with respect to the flanges in the circumferential direction/nor was there evidence of damage upon dismounting.

The tires/bead retainers were then remounted and installed as before but inflated to 20 psig. The tires were then driven for 200 miles on secondary roads at an average speed of 26.2 mph and an average temperature of −25.7° F. At the end of the test there was no bead slip encountered nor was there damage to the bead retainer or the tire beads.

For the bead slip tests a five-ton tractor with no tires on the intermediate axle was used for this testing procedure. The weight on the rear axle was adjusted to 11,940 lbs. (5,970 lbs per tire).

The tractor, with the test tires on the rear axle was operated in first gear high range at approximately 4 mph. A drawbar load was applied by using the brakes on the load vehicle. The speed of the test vehicle was reduced until a drawbar pull of 8,500 lbs (±500 lbs) was attained. This drawbar load was maintained as close as possible for approximately 50 yards. Total length of the run varied up to 100 yards. At the conclusion of each run, the tires were inspected for bead slip, then the load vehicle towed the test vehicle back to the starting point and the cycle was repeated until 3 good data runs were accomplished. The final tire pressure was recorded and tire pressure adjusted in preparation for the next series of runs. Three tire pressures − 30, 20, and 10 psig - were used.

The results of the tests are set forth in Table 1.

TABLE 1

| Test No. | Cold Infl Press. (psig) | No. of Runs | Mean Road Spd (mph) | Final Inflation Pressure (psig) | Remarks |
|---|---|---|---|---|---|
| 1 | 30 | 3 | 2.3 | 31 | No bead slip |
| 2 | 20 | 3 | 1.9 | 20 | No bead slip |
| 3 | 10 | 3 | 1.9 | 11 | 13/16-in total bead slip |

The above test illustrates the bead retainers relatively good performance even in the relatively harsh environment of an Alaskan winter. The beads remained seated on a rim, keeping the tire from deflating and without damage to either the bead retainer or the beads of the tire.

These descriptions and details have been shown for the purpose of illustrating this invention and will become apparent to those skilled in the art that various changes and/or modifications may be made therein without departing from the original spirit or scope of the invention.

It is claimed:

1. A device for retaining the beads of a tire against the flanges of a multi-piece rim comprising:
    a ring body having a substantially axial split forming first and second circumferential ends, a pair of axial ends for engaging the beads of a tire, the ring body having a minimum inside diameter at each of its axial edges and a larger inside diameter in its axially central portion;
    a mechanical means for fastening and unfastening the first and second circumferential ends of the ring body;
    the ring body being manually deformable, when the first and second circumferential ends are not fastened to one another, into a helical configuration for insertion between the tire beads, the diameter of the ring body being manually deformable to a diameter which is smaller than the diameter of the tire beads, the ring body also being manually deformable in the axial direction and being substantially manually non-deformable with the first and second circumferential ends fastened together.

2. The device of claim 1 wherein the pair of axial ends for engaging the beads are deformable.

3. The device of claim 1 wherein the pair of axial ends for engaging the beads of the tire are elastomeric.

4. The device of claim 2 wherein the ring body comprises a single material.

5. The device of claim 1 wherein the ring body has an axial width "W" which is equal to or greater than "S", wherein S is defined as:

RM-BW1-BW2 and wherein RM is the distance between the flanges and BW1 and BW2 is the bead width of the first and second bead portions of the tire.

6. The device of claim 5 wherein "W" is less than 107% of "S".

7. The device of claim 6, wherein "W" is in the range of 101% to 105% of S.

8. The device of claim 7 wherein "W" is in the range of 101% to 102.5% of S.

9. The device of claim 7 wherein the bead retainer is axially compressible less than 1% of its axial width "W" under axial force which is equal to the axial force that the device would encounter when mounted on a tire/rim assembly which is at normal load and inflation pressure.

10. The retainer device of claim 1 wherein the annular body has substantially a bow tie cross-section in the axial direction.

11. The bead retainer of claim 1 wherein the annular body has substantially a "H" shaped cross-section in the axial direction.

12. The bead retainer device of claim 1 wherein the radially inner end of the ring is spaced from the radially outer surface of the rim.

13. The bead retainer device of claim 1 wherein the central portion of the ring body has an air passageway.

14. An assembly comprising a multi-piece rim, a tire mounted upon the rim with a pair of tire beads engaging the rim and a device interposed between the beads of the tire for retaining the tire beads in a desired position, the assembly comprising:

(a) a multi-piece rim having a cylindrical base, a pair of axially opposed bead seating surfaces with bead retaining flanges extending radially outwardly from the axial outer ends of the bead seating surfaces; (b) a tire mounted on the rim and having a crown portion, a pair of sidewall portions extending radially inwardly from the crown portion to a bead portion, each bead portion being disposed adjacent to a bead seating surface and the respective bead retaining flange of the rim; and (c) a device disposed between the bead portions of the tire for retaining the bead portions in engagement with the bead seating surfaces and in engagement with the bead retaining flanges of the rim, the bead retaining device comprising:

a ring body having a substantially axial split forming first and second circumferential ends, a pair of axial edges, a minimum inside diameter at each of its axial edges and a larger inside diameter in an axially central portion, a pair of axial opposed bead retaining surfaces at each of its axial edges of the ring body engaging the bead portions of the tire, a fastening means for releasably attaching the ends of the ring body together, the fastening means attached to one of the circumferential ends and releasably attached the other circumferential end, and the axially central portion of the bead retaining device being radially spaced apart from the cylindrical base of the rim.

15. The bead retainer device of claim 14 wherein the bead retainer extends radially outwardly to a point equal or less than the radially outermost portion of a bead bundle disposed within the bead portions of a tire.

16. A bead retainer comprising:

An annular non-metallic body having a substantially transverse split therein, forming first and second ends, a pair of axial ends for engaging axially outwardly against beads of a tire, and said body being manually deformable in the axial direction while being substantially incompressible in the axial direction; and a fastening means carried by one of said first or second ends for releasably securing the first and second ends together.

* * * * *